March 8, 1938. J. PETRUCHKIN 2,110,471
GRAIN HARVESTER
Filed Feb. 24, 1937 5 Sheets-Sheet 1

INVENTOR.
J. Petruchkin
BY
ATTORNEY.

March 8, 1938.　　　　J. PETRUCHKIN　　　　2,110,471
GRAIN HARVESTER
Filed Feb. 24, 1937　　　　5 Sheets-Sheet 3

INVENTOR.
J. Petruchkin
BY
E. F. Windrath
ATTORNEY

Patented Mar. 8, 1938

2,110,471

UNITED STATES PATENT OFFICE 2,110,471

GRAIN HARVESTER

Julio Petruchkin, Buenos Aires, Argentina

Application February 24, 1937, Serial No. 127,496
In Argentina March 14, 1936

6 Claims. (Cl. 56—64)

The present invention relates to harvesting machines and the like and its principal object is to provide a harvesting machine capable of gathering cereals and in particular maize even when the plants lie on the ground at different angles with respect to the furrow or space between the lines of sowing.

Another object of the invention is to provide a machine of the kind indicated, which shall be capable of taking the plants and if necessary lifting them at the same time, and of maintaining them in a suitable position, cutting them, removing the ears or cobs and, if desirable, dehusking the latter and transporting them to be bagged, said machine being furthermore provided with means to ensure that the filled bag or sacks may be discharged and take up a position beyond the path of the machine.

With these ends in view, the machine according to the present invention comprises essentially a take-up guide in the form of a screw of special construction, which co-operates with a cutting device followed by a husk and/or cob-removing device, which together with the said take-up guide will deliver the separated cobs to a bagging assembly including an elevator; said bagging assembly, the take-up guide, the cutter and the husk and/or cob-removing device are driven from one and the same main actuating means, which for example, may be the main wheels of the machine especially if the machine is designed for animal traction. Preferably, the machine is further provided with a directing and lifting device for the plants, which device is positioned in the forward part of the machine for the purpose of directing the plants towards the take-up guide and if necessary lifting them and placing them in a suitable position for being taken up without damage to the ears or cob.

It is likewise advantageous to provide in the machine means for moving the principal parts out of their operative position in order to facilitate the transport of the machine as a whole from place to place. Said means may take the form of an oscillating frame for the principal parts, said frame being mounted on the chassis of the machine and provided with adjusting and securing means.

The machine is so designed that when the main wheels run along two parallel furrows, the forward or lower end of the take-up guide will pass along the ridges and, when in its operative position, will be at a height slightly less than that of the crests of the ridges so that said take-up guide may take fallen plants from below. The directing devices, if fitted, will move forwardly along and in the furrows in order to direct plants which have fallen across the furrow, into alinement with the line of sowing.

The operative parts of the machine are so interrelated that the plants are guided and if necessary supported, gently without blows or treatment which might damage them, and that at the time when the plants are being cut, they are lightly held against undesired movement.

As illustrated, the machine consists of a chassis 10 from the rear portion of which (the portion to the right in Fig. 1) the steering wheel 12 is suspended by means of a rotary assembly of known type which comprises a rotary supporting ring 14 from which supporting arms 16 depend, said arms terminating in bearings 18 for the axle 20 of said wheel, and the securing ring 22 fixed to the chassis and designed to maintain the ring 14 in its operative position, said ring 14 being operatively connected to a hand wheel 24 by means of a series of articulated levers 26a, 26b, 26c, 26d, a worm drive indicated at 26f and the steering rod 28.

Figure 2:
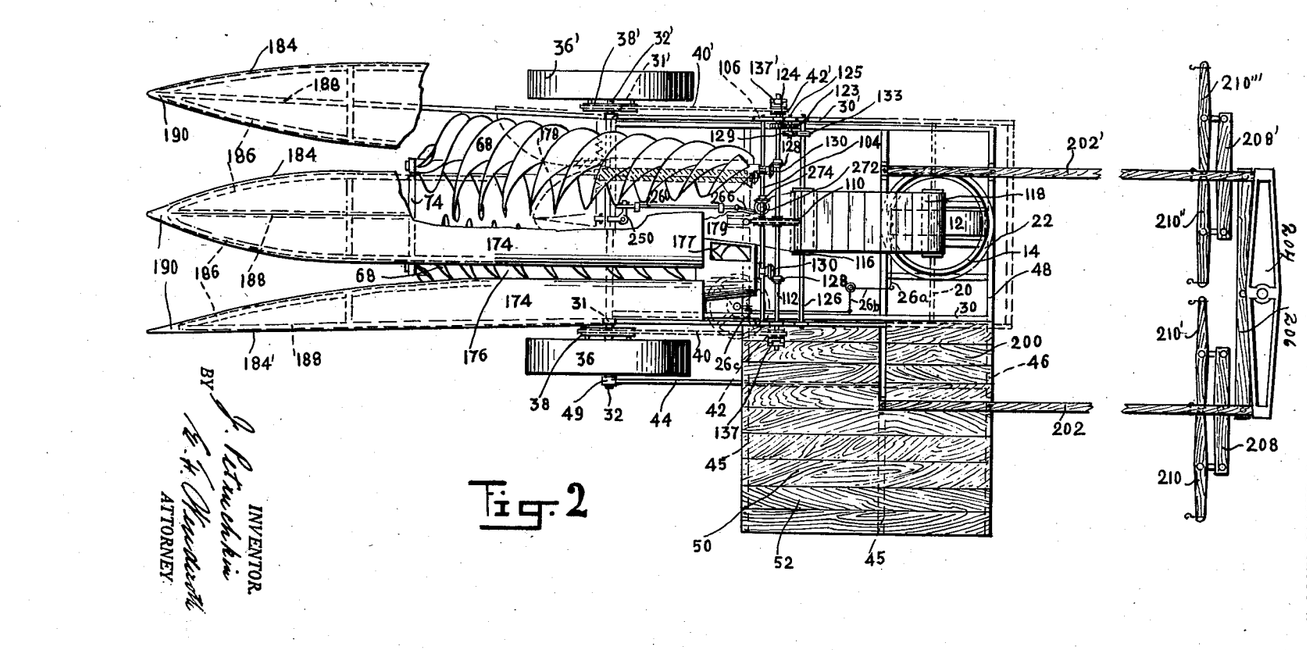
Fig. 2 is a plan view of the machine with certain parts omitted.

The forward ends of the side members 30, 30' of the chassis 10 are provided with bearings 31, 31' which rotatably support the axles 32, 32' to which the framework 34, which carries the operative parts of the harvester, is rigidly secured, said axles carrying on their ends which project outwardly from the side members 30, 30', the main wheels 36, 36' which are fixedly secured to the axle. On the side of said wheels facing the corresponding side member, a chain wheel 38, 38' is secured to rotate with its main wheel and said chain wheel is coupled by means of a chain 40, 40' to a driven chain wheel 42, 42' (Fig. 2) which forms part of a drive for the principal parts of the harvester, said drive being more fully described below.

Figure 3:
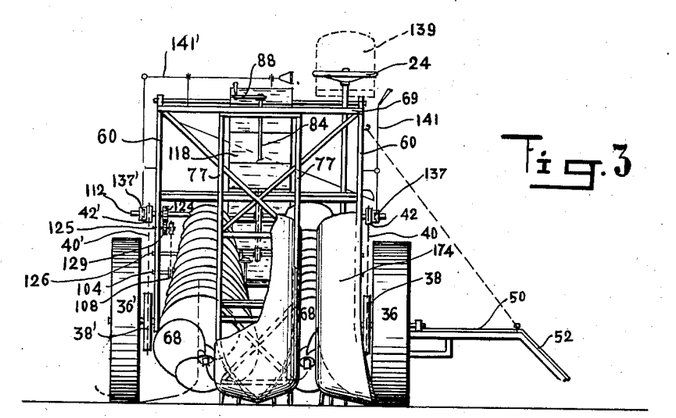
Fig. 3 is a front elevation illustrating the positioning of the take-up guides and showing one of said guides provided with its envelope.

At one side of the chassis—on the right in Fig. 3—a third side member 44 is provided which is secured at one end to an extension 46 (Fig. 2) of the rear cross member 48 of the chassis and at its other end has a bearing 49 freely traversed by the outer portion of the axle 32, so that said additional side member 44 runs parallel to the side member 30 at a suitable distance outwards therefrom, to support a discharge platform, indicated in general by the reference 50, the free longitudinal marginal portion 52 of which is inclined downwardly to facilitate the discharge of the filled bags (see Fig. 3). To assist in supporting the platform and the third side member, laterally extending beams 45 are provided at suitable intermediate points.

The principal operative parts of the harvester are mounted on a frame 34 which includes the upper members 56, lower inclined members 58, uprights 60, intermediate ties 62, rear ties 64, and the supporting structure 66 for the take-up guides 68.

The lower inclined members 58 extend between the rear ties 64 and the lower ends of the uprights 60, which are fixedly secured at an intermediate point to the axles 32, 32', their upper ends being rigidly united to the forward ends of the upper members 56. The two side structures of the framework are interconnected by means of upper cross members 69, 69', a lower forward cross member 70 and an intermediate cross member 71, to which latter the rear end of the main members 73 of the supporting structure 66 are secured. The other ends of said main members 73 are interconnected by the advanced cross member 75 and are supported by the inclined ties 77 which are anchored to the cross member 69. The supporting structure comprises a pair of forward bars 72 depending from the principal members 73 and connected at their opposite ends by a lower advanced bar 74. This portion of the structure carries the thrust bearings 76 in which the forward ends of the shafts 78 of the take-up guides 68 are rotatably supported.

At a convenient point between the lower inclined members 58 a nut 80 is mounted in such wise that it may rock and be displaced in a longitudinal direction with respect to said members 58. A rod 84 passes through said nut and through a second nut 85 secured to a cross member 86 which extends between side members 30, 30' of the chassis, and for this purpose the lower end of said rod is provided with a right-hand thread corresponding to nut 80 and with a left-hand thread corresponding to nut 85; said rod 84 extends upwardly through the machine and carries at its upper end a crank handle 88. It will readily be understood that since the axles 32, 32' are fixedly secured to the framework 34 and are rotatably supported in the bearings 31, 31' mounted on the chassis, rotation of the crank handle 88 whereby the rod 84 is also rotated, will cause the nut 80 to move so as to cause the rearward portion of the framework to move away from or towards the chassis and thus to lower or raise the forward end of said framework and thereby to move the parts carried by the framework into or out of their operative position.

Upon a support 82 extending between the lower inclined members 58 there is carried a pair of thrust bearings 90 (see Fig. 11) in which the rear ends of the shafts of the rolls 92, 94 forming the husk and/or cob removing device, are rotatably supported, the other ends of said shaft being rotatably supported in a pair of thrust bearings 96, 96' mounted on the lower forward cross member 70 which extends between the lower ends of the uprights 60. The rear end of the shaft of one of said rolls projects beyond its bearing to receive a conical gear 100 which meshes with a second conical gear 102 fixedly mounted on a shaft 104 supported in a pair of bearings 106 (Fig. 2) carried by the inclined members 58. Said shaft 104 carries at a suitable point, for example between the framework and one pair of rolls 92, 94 a gear 108 (Fig. 1) which is operatively coupled either directly or by means of a chain 109 to another gear 110 fixedly secured on a shaft 112 which extends parallel to shaft 104 between bearings 114 mounted on the intermediate member 62.

Figures 1, 11:
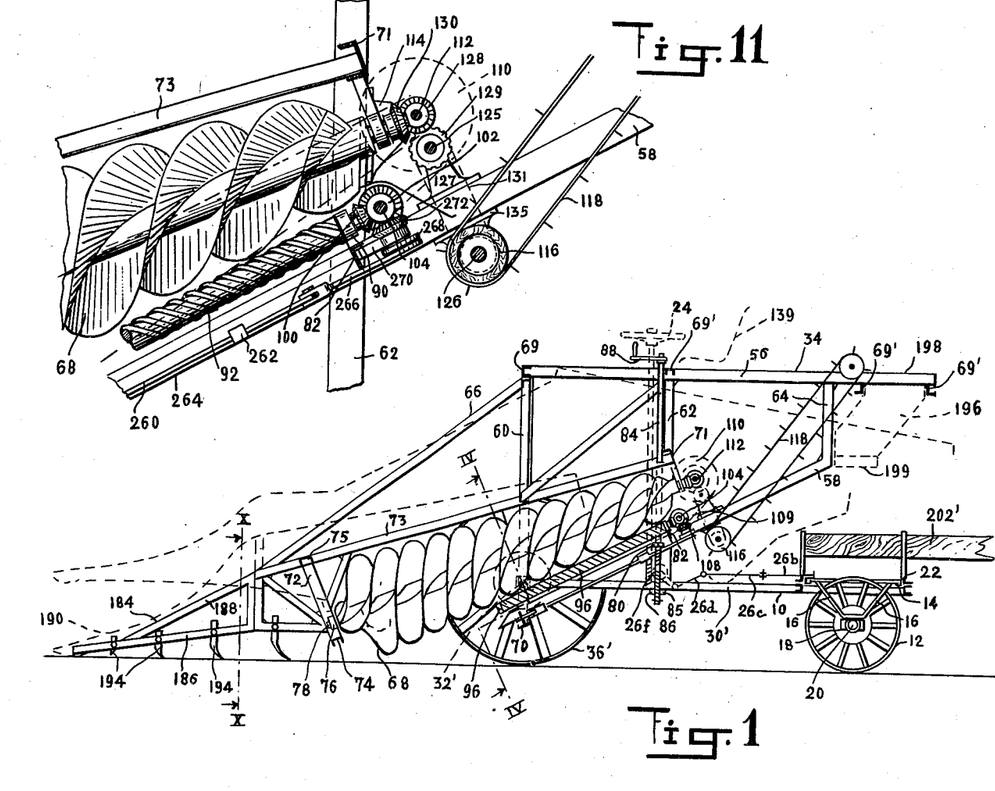
Fig. 1 is a side elevation of the machine with certain portions cut away or omitted for clearness.
Fig. 11 is a detail view showing the mounting of the rear ends of the take-up guide and husk and/or cob removing elements on an enlarged scale.

The shaft 104 also carries on its ends which project beyond the framework the driving chain wheels 42, 42' and has likewise mounted on it, the conical gears 128 which mesh with conical gears 130 mounted on that portion of the rearward ends of the shafts 78 of the take-up guides 68 which project beyond the rearward bearing 76' mounted on the intermediate cross member 71. The shaft 104 is operatively connected to a third shaft 126 which carries the driving roller 116 of the elevator 118, by means of a gear 124 (Fig. 2) carried by shaft 104 and meshing with a gear 123 carried by a stub-shaft 125 mounted on a bearing 127 (Fig. 1) fixed on member 58. The stub-shaft 125 carries a chain-wheel 129 coupled by means of a chain 131 to a driven chain wheel 133 mounted on the elevator actuating shaft 126. The shaft 126 is supported in bearing 135 mounted on members 58 (Fig. 11).

Preferably, each driving chain wheel 42, 42' forms part of the driving member of a clutch 137, 137' the driven part of which is fixedly mounted on shaft 112 so as to make it possible to declutch one or other or both sides of the machine as may be required, for instance when turning a corner. The clutches may be operated from the driver's seat 139 by means of a suitable linkwork indicated at 141, 141'.

The bearings for the shafts of the take-up guides and the rods 92, 94 are so disposed and the members to which said bearings are fixed are so proportioned that the take-up guides and the rolls 92, 94 are, when in their operative position, that is, when the forward end of the frame 34 is lowered, inclined upwardly and rearwardly from the horizontal and with respect to the machine.

Figure 5:
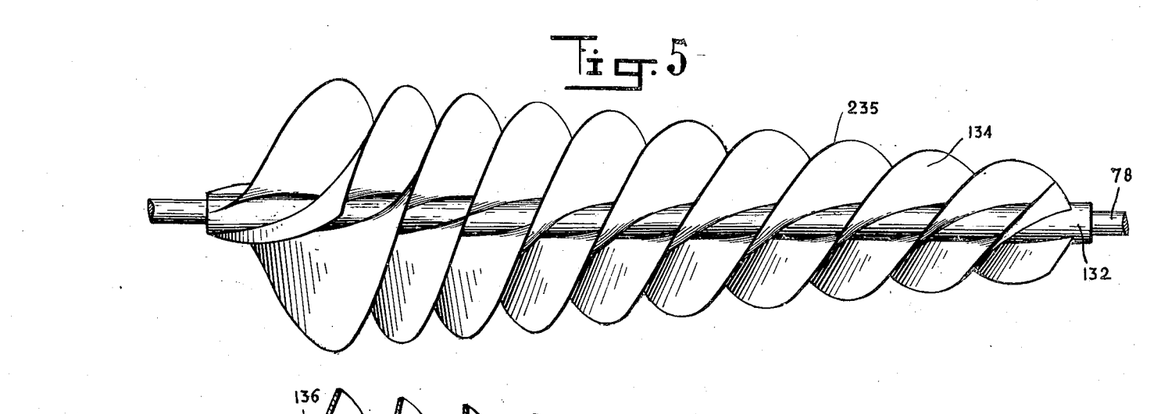
Fig. 5 is a side elevation.

The most important part of the machine is formed by the take-up guide the construction of which will now be described with particular reference to Figs. 5 and 6.

Said take-up guide comprises a cylindrical tube 132 carrying on its outer surface a screw 134. A shaft 78 passes through said tube and is rigidly secured thereto as for example by means of the distance pieces 233 which are welded to the shaft and to the tube to form a unitary structure.

The screw is best described as being formed by the advance along a helix of uniform pitch traced on the tube 132, of a radius vector 136 of varying length, which is inclined first towards the direction of advance, the inclination being gradually and uniformly modified from the point of origin up to an intermediate point until said radius vector is inclined in a direction opposed to that of the advance whereupon the inclination remains constant. The length of the radius vector varies from zero at the point of origin up to a maximum at a point between the origin and the aforesaid intermediate point and thereupon diminishes at a uniform rate which is preferably less than that of the rate of growth.

In this manner, a screw is obtained of which the enveloping surface has the form of a truncated cone of relatively small height united by its base to a second truncated cone of relatively great height, the inclination of the surface of the screw itself varying in such wise that at a point lying within the second truncated cone the radius vector is perpendicular to the axis of the cone.

Preferably, the point at which the variation of the inclination of the radius vector ceases coincides in the assembled machine with the forward end of the shorter of the two rolls 92, 94 of the husk and/or cob removing device, and the radius vector attains its maximum length in less than one complete rotation from the origin. It is to be understood that the screw may have more than one thread formed in the above described manner.

Figure 6:
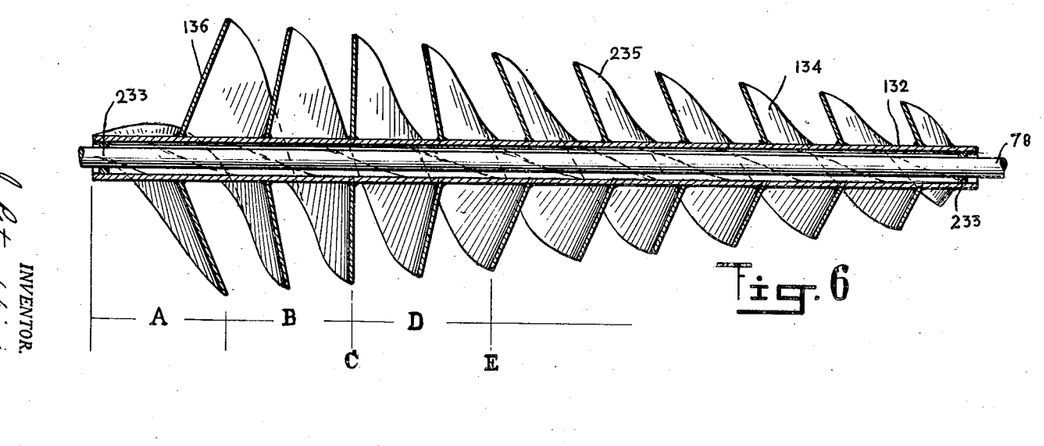
Fig. 6 a longitudinal section of the take-up guide.

In Fig. 6 the radius vector makes at the origin O an angle of approximately 22° with the perpendicular to the axis of the screw, and is inclined in the direction of advance of the screw, that is to the right in the figure. At the origin the length of the radius vector is zero and grows to a maximum in the axial distance A, its inclination with respect to the perpendicular to the axis decreasing over the axial distance A+B until at the point C the radius vector is perpendicular to the axis. Thereafter the inclination continues to decrease—or to increase in the opposite direction—over the axial distance D, until at the point E the radius vector makes an angle of approximately 22° with the perpendicular to the axis, the direction of inclination being then opposed to that of advance of the screw. Thereafter the inclination remains constant but the length of the radius vector gradually decreases but does not vanish within the length of screw used in the machine.

The screw is so dimensioned, disposed in the machine and coupled to the source of power that the projection on the centre line of advance of the machine of the distance between two successive positions which a point moving along the edge 235 of the wing of the screw will take up in a specified time is equal to the distance through which the machine advances in said time. Furthermore, the drive for the screw is so arranged that the advancing effect of the transporter or rear portion of the screw is to the rear when the machine as a whole moves forward.

By this means the advantage is achieved that when a plant has entered the screw of the take-up guide, the latter on being rotated and carried forward by the machine will wind itself freely past the plant without exerting upon it any force which might tend to damage.

The change in the inclination of the radius vector has for its object to provide at the forward end of the screw, a surface which on arriving at the neighbourhood of the plant will approach it in a substantially horizontal direction and will pass beneath said plant in a direction substantially perpendicular to the line of sowing. The variation in the inclination of the radius vector likewise provides a surface on which weak or bent plants may rest and said surface gradually approaches the vertical for the purpose of lifting and straightening the plant before the latter shall have reached the husk and/or cob removing rolls. That portion of the screw in which no further change in the inclination of the radius vector occurs serves merely as an ordinary helical transporter.

Figure 7:
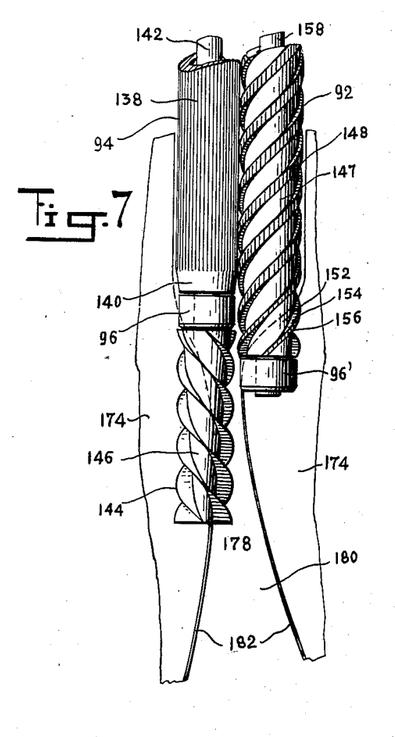
Fig. 7 is a plan of a portion of the husk and/or ear removing device.
Figure 8:
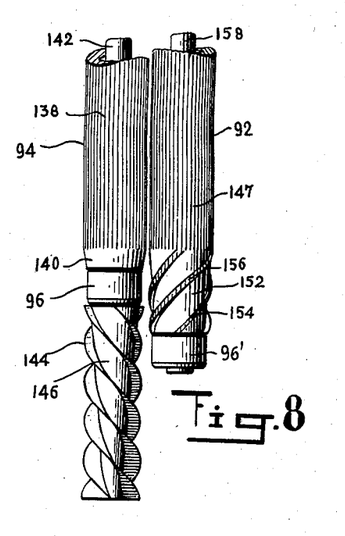
Fig. 8 is a plan of a slightly modified husk and/or ear removing device.

The husk and/or cob removing device consists as has already been indicated of a pair of rolls 92, 94 (see Figs. 7 and 8). One of these rolls, for example the roll 94, consists of a longitudinally ribbed cylindrical body 138 which, at its forward end merges into a smooth frusto-conical portion 140 from which the forward end of the shaft 142 on which said roll is rigidly mounted projects, said forward end being supported in a thrust bearing 96 carried by the lower forward cross member 70, and projecting beyond said bearing to receive a helical screw 144 of constant diameter formed upon a conical core 146. The second roll 92 likewise comprises a cylindrical body 147 which may be ribbed as shown in Fig. 8 or provided with a square screw thread 148 the outer face of which may be ribbed as shown in Fig. 7. At its forward end the cylindrical body 147 of the roll 92 merges into a frusto-conical portion 152 carrying a rectangular screw thread 154 of constant outside diameter. The width of the face 156 of the screw thread 154 diminishes as said thread approaches the smaller end of the frusto-conical portion 152. A shaft 158 on which said roll 92 is fixedly secured projects beyond said roll and is rotatably supported in a thrust bearing 96' mounted on said cross member 70, but in an advanced position with respect to the bearing 96 so that each of said bearings 96, 96' is opposite an operative portion of the opposite roll. The shafts 142 and 158 project beyond the rearward ends (not shown in Figs. 7 to 8) of the rolls and are rotatably supported in the thrust bearings 90 already mentioned which are at the same level.

Figures 4, 9, 10:
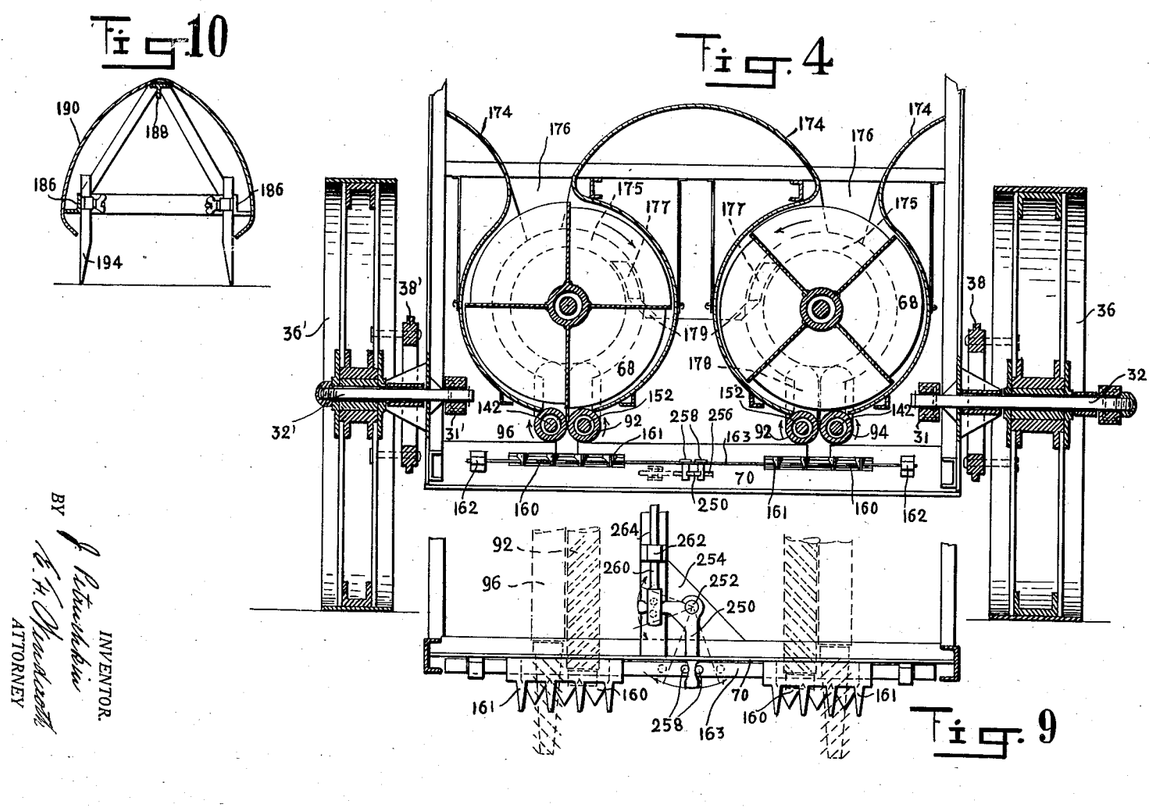
Fig. 4 is a cross-section of the machine on the line IV—IV of Fig. 1.
Fig. 9 is a part plan view illustrating the mounting of the cutter.
Fig. 10 is a cross section on the line X—X of Fig. 1 illustrating the construction of the directing and lifting device.

Below the forward ends of the rolls 92, 94 and in a position which coincides substantially with that of the forward bearings 96, the cutter-bar 163 carrying the cutters 160 (see Figs. 4 and 9) is supported beneath the combs 161 by guides 162 secured to the cross member 70 so that said cutter is free to reciprocate transversely of the machine.

The actuating mechanism for the cutter comprises a bell crank lever 250 pivoted at 252 to a plate 254 secured to and extending rearwardly of the member 70. One arm of the lever 250 extends through a slot 256 in said member 70 and between a pair of pins 258 projecting from the cutter-bar 163. The other arm is articulated to one end of an actuating-bar 260 which passes through guides 262 carried by a longitudinal member 264 extending between the member 70 and the support 82. The other end of said actuating bar 260 (see Fig. 11) is coupled to one end of a connecting-rod 266 the other end of which is eccentrically pivoted to a disc 268 carried by a stub-shaft supported by a bearing 270 mounted on support 82. The said stub-shaft carries on the other side of the bearing 270 a conical gear 272 which meshes with a conical gear 274 (best seen in Fig. 2) carried by a shaft 104.

As will readily be apparent, the rotation of eccentric 268, which is driven from shaft 104, will cause longitudinal reciprocation of actuating bar 260, which in turn will cause the bell crank lever 250 to oscillate about its pivot and thereby produce transverse reciprocation of the cutter-bar 163. The timing of the cutter mechanism with respect to the remaining machine parts cannot be exactly specified since, for perfect working, the plants would have to be equally spaced along the line of sowing and this, of course, is not in practice the case.

In order to provide supporting surfaces for the stems of weak or bent plants as well as to protect the ears or cobs and to prevent any material which enters the machine from leaving it except by passing through the rolls 92, 94 or through the cob discharge opening, the takeup guides 68 are surrounded by a protecting envelope 174 (Fig. 4) which has an upper longitudinal opening 176 and the lower longitudinal opening 178. The lower longitudinal opening 178 widens out at its forward end and indicated at 180 in Fig. 7 in order to provide a pair of guiding edges 182 which converge towards the roll 92, 94 said rolls extending from the rear end of the take-up guides forwardly to an intermediate point of said main screws.

The rear end 175 of the envelope is closed and provided with a lateral discharge opening 177 directed towards the centre line of the machine, sloping chutes 179 being provided in order to direct the cobs or ears thrown out through said opening towards the elevator 118.

As has already been indicated, the machine is preferably provided with a directing and lifting device 184 (Figs. 1, 2 and 10) which consists of a frame 186 approximately ogival in plan from the point of which a riser 188 extends rearwardly and upwardly to form a ridge, said frame being provided with a smooth cover 190 of sheet material. The frame 186 carries adjustable prongs 194. These devices may be designed to operate along both edges as shown at 184 in Fig. 1 or only one half of the structure described may be used at 184' in Fig. 1. The devices are secured to the forward end of the framework of the machine in such position that as the machine advances the directing and lifting devices will move along furrows. As will readily be understood, said devices by reason of their shape and construction will insinuate themselves below any plant which may have fallen across the furrow and will lift it and provide a support for such plant owing to the presence of the cover 190. Any fallen plants which lie so that their heads are directed in the direction of advance of the machine and which make a relatively small angle with the line sown will be swept into line by the prongs 194 so that in either event the take-up guide 68 may take such plants without any difficulty.

The machine is completed by the hopper 196, the input opening 198 of which is substantially on a level with the upper end of the elevator 118 and the discharge opening 199 of which is positioned over a sunk portion 200 of the platform 50.

When animal traction is employed, I prefer to use the system of compensated cross-bars shown at the right of Fig. 1. As shown, it is designed for four pairs of horses in tandem and will give an equalized pull. It comprises the two shafts 202, 202' which project from the rear of the chassis and are coupled at their free ends by means of a fixed cross member 204 to the midpoint of which the main oscillating cross member 206 is articulated. Said main oscillating cross member has articulated to each of its ends an intermediate orcillating cross member 208, 208' each of which has articulated to each end a tie-up cross member 210, 210', 210'', 210'''. The manner in which this system operates is well known and further description thereof is consequently deemed to be superfluous.

For the purpose of describing the operation of the machine it will be supposed that it is provided with two take-up guides 68 and two pairs of rolls 92, 94 as shown in the drawings, although it is to be understood that the machine may also be constructed with only one take-up guide or with more than two. As has already been stated, the parts are disposed in such manner that when the wheels 36 of the machine run along two furrows the take-up guides 68 move along the tops of ridges and the directing and lifting devices 184, if any, move along the furrows. The purpose and operation of said directing and lifting devices has already been described so that the operation of the machine itself will now be described on the supposition that the plants have already been placed in proper position to be taken by the take-up guides. It will, of course, be understood that the placing in position applies only to plants which have fallen or become bent or trodden down so that their stems no longer stand upright or lie along or parallel to the ridges representing the line of sowing. Plants which are standing perfectly erect can be taken by the take-up guide without the necessity for any special positioning.

It should be remembered that the advance of the screws of the take-up guides with respect to the machine is to the rear whereas the machine carries the take-up guides forwardly with respect to the line of sowing. The two take-up guides rotate in opposite senses so that a point on the edge of the screw approaches the centre line of the machine when it moves downwardly. The rolls of each pair likewise rotate in opposite directions so that a point on their surface approaches the space between the rolls when descending.

The take-up guides which, as shown in the drawings, are disposed with their shafts inclined with respect to the ground are so arranged that the edge of the screw in the neighbourhood of the place where the radius vector attains its maximum length may penetrate slightly below the crest of the ridges. As has already been stated, that portion of the edge approaches the line of sowing laterally and should a plant have fallen said edge will pass below it somewhat in the manner of a lateral spade thrust. In this way, downward blows which might injure the plant are avoided and also, because of the penetration of said edge below the crest of the ridges, any lateral cuts which might damage the stems or the lower cobs are avoided.

Upright plants are first approached by the smallest end of the take-up guides so that the wing of the screw winds itself past the plant and, by reason of the fact that the rearward advance of the screws and the forward movement of the machine are equal as explained above, the wings of the screws do not exert any force on the upright stems until such time as the latter have been seized by the rolls 92, 94.

Bent or weak plants which are first supported by the cover 190 of the devices 184, are received by the envelope 174 and are likewise supported and gradually straightened by the wings of the take-up guide 68.

By reason of the fact that the take-up guides 68 are inclined rearwardly and upwardly and also because of the reduction of the effective diameter of the screw an increasing portion of the stem of a plant which has entered the machine will be visible between the take-up guides and the ground as the machine advances past such stems, so that the rolls 92, 94 may seize the plant and the cutter cut them at a point above the level of the crest of the ridges.

As the machine advances, the converging edges of the envelope 174 guides the plants towards the space between the cob-removing rolls. The plant is first taken by the helical screw 144 of the roll 94. This screw serves primarily to guide the plant positively towards the cutter and into the space between the rolls and secondarily to move the lower portion of the stem rearwardly with respect to the machine after the stem has been cut and before it has been definitely seized by the two rolls. Said helical screw 144 likewise serves to move the stem positively past the bearing of the other roll 92.

As a consequence of the conicity of the core of said screw 144, shortly after the stem has been cut, it is compressed between said screw and first the bearing and then the forward end of roll 92 thereby preventing the stem from rising under the action of the corresponding take-up guide, which could not previously have lifted the plant by reason of the fact that the stem was then still united to the root.

The forward portion of roll 92 which carries the rectangular thread 154 serves to move the end of the cut stem past the bearing of the roll 94. The purpose of the conicity 140 of the end of roll 94 properly so called is gradually to increase the pressure on the stem until the stem has moved between the operative parts of the two rolls.

As will readily be seen from the description given above, of the manner in which the rolls 92, 94 rotate, the plant will be drawn downwards by these rolls since the take-up guide offers no resistance to this movement, and the stem will therefore slowly pass downwardly between said rolls whereby the cobs or ears which it bears are successively presented to the upper portion of the pair of rolls. Since the stem is moving downwardly, the ears or cobs approach the rolls with their pedicel foremost. The rolls therefore seize and compress the pedicel while at the same time drawing it downwards, but since the cob itself cannot pass between the rolls and its connection to its pedicel is relatively weak, the cob is separated without suffering injury and is then carried to the rear end of the rolls by the transporter action of the take-up guides, the edges of the screw of which all but touch the rolls. If the rolls when seizing the pedicel likewise seize a portion of the husk, as is generally the case, the cob will at the same time be dehusked.

On arriving at the rear end of the envelope 174, which is closed, the cob cannot proceed further so that it is lifted by the wings of the take-up guide and thrown out centrifugally through the opening 177 whereupon it falls upon the sloping chute 179 which delivers it to the lower end of elevator 118 which in turn lifts the cob towards the input opening of the hopper 196.

The hopper may be provided at its outlet end with a door (not shown) and is preferably of capacity equal at least to that of one bag so that there will be sufficient time to remove a full bag and substitute an empty bag without danger of overflowing. The full bags when tied up are carried or rolled to the sloping marginal portion 52 of the platform which will ensure that the bags when released will fall clear of the track of the harvester.

By reason of the presence of the envelope 174 and the shape of the screw of the take-up guides, everything which enters the machine including any soil lifted by the forward portion of the take-up guide will not leave the machine except by passing through the rolls 92, 94 or through the cob discharge opening so that if the forward end of the take-up guides lift a cob which has fallen off or become separated from its stem such cob will pass right through the machine and be delivered together with the cobs separated by the machine through the discharge aperture and thence to the elevator.

I claim:

1. In a grain-harvester, a rotary take-up guide adapted to take the plants, position them correctly for subsequent treatment, and transport first the plants and then separated cobs from the front to the rear of the harvester, said take-up guide comprising a cylindrical core carrying a screw the surface of which is the trace of a radius vector of a length which varies from a minimum value at one end of the screw through a maximum value to a second minimum value at the opposite end of the screw said vector moving along a helix of constant pitch traced on said core, the angle between said radius vector and the perpendicular to the axis of the core, drawn through the foot of the radius vector, varying so that the radius vector is inclined first towards the direction of advance and subsequently and at an intermediate point of said take-up guide, in the opposite direction the inclination thereafter remaining constant.

2. In a grain-harvester a rotary take-up guide adapted to take the plants, position them correctly for subsequent treatment, and transport first the plants and then separated cobs from the front to the rear of the harvester, said take-up guide comprising a cylindrical core carrying a screw the surface of which is the trace of a radius vector of varying length which moves along a helix of constant pitch traced on said core the inclination of said radius vector with respect to the perpendicular to the axis of the core drawn through the foot of the radius vector varying so that the radius vector is inclined first towards the direction of advance and subsequently and at an intermediate point of said core, in the opposite direction, the length of said radius vector increasing from substantially zero at the origin of the screw to a maximum at a point between the origin and said intermediate point and then decreasing from said point of maximum length to the end of the screw remote from the origin.

3. In a grain-harvester a rotary take-up guide for the plants, comprising a cylindrical core carrying a screw the surface of which is the trace of a radius vector moving along a helix of constant pitch traced on the surface of the core, the angle between the radius vector and the perpendicular to the axis of the core drawn through the foot of the radius vector decreasing at a constant rate as the radius vector advances from the origin to a given intermediate point of the screw, from a value at which the radius vector is inclined towards the direction of advance, through zero to an equal value in the opposite direction, and then remaining constant, the length of said radius vector varying from zero at the origin to a maximum at a point between the origin and said intermediate point and then decreasing at a constant rate such that the radius vector does not vanish within the remaining length of the screw.

4. A grain-harvester comprising a chassis, a frame mounted on said chassis, a rotary take-up guide mounted in said frame with its axis inclined upwardly and rearwardly with respect to the harvester, said take-up guide having a cylindrical core carrying a screw the surface of which is the trace of a radius vector of varying length moving along a helix of constant pitch traced on said core, the angle between said radius vector and the perpendicular to the axis of the core drawn through the foot of the radius vector varying from the origin at the forward end of the screw so that at said forward end the radius vector is inclined in the direction of its advance and at an intermediate point of the take-up guide, its inclination is reversed and then remains constant, the length of the radius vector increasing from substantially zero at the forward end to a maximum at a point between said forward end and said intermediate point and thereafter decreasing at a constant rate, a pair of co-operating cob-removing rolls positioned immediately below and extending lengthwise of said take-up guide, the clearance between the screw of said take-up guide and said rolls being a minimum, said rolls extending forwardly from the rear end of said take-up guide to approximately said intermediate point, and comprising a roll having a cylindrical ribbed body rigidly mounted on a shaft and merging at the forward end into a smooth frusto-conical portion, said shaft extending beyond said forward end and through a bearing and carrying beyond said bearing a helical screw of constant diameter formed on a frusto-conical core, and a second roll having a cylindrical body rigidly mounted on a second shaft, and merging at its forward end into a frusto-conical portion carrying a rectangular screw thread the width of whose face diminishes as the thread approaches the smaller end of the frusto-conical portion, said second shaft extending forwardly beyond said second roll and into a bearing located in an advanced position in the harvester with respect to the bearing for the first roll, and means for synchronously driving said take-up guide and said rolls.

5. A grain-harvester comprising a chassis, a frame mounted on said chassis to permit of oscillation in a vertical plane, means for adjusting the inclination in said plane of said frame with respect to the chassis, a take-up guide mounted on said frame with its axis inclined upwardly and rearwardly with respect to the harvester, a pair of co-operating cob-removing rolls rotatably mounted on said frame immediately below said take-up guide and extending lengthwise thereof, a cob-collecting hopper mounted at the rear end of the frame, an elevator positioned between the rear end of the take-up guide and said hopper, means for synchronously driving said take-up guide, said rolls and said elevator, an envelope surrounding said take-up guide and having a longitudinal upper opening and a longitudinal lower opening, said lower opening embracing said rolls and widening out at its forward end, said envelope being closed at its rear end and provided with a lateral discharge aperture, and a sloping chute extending between said discharge opening and the lower end of said elevator.

6. A grain-harvester comprising a chassis, a frame mounted on said chassis, a rotary take-up guide mounted on said frame with its axis inclined upwardly and rearwardly with respect to the harvester, said take-up guide having a cylindrical core carrying a screw the surface of which is the trace of a radius vector of varying length moving along a helix of constant pitch traced on said core, the angle between said radius vector and the perpendicular to the axis of the core drawn through the foot of the radius vector varying from the origin at the forward end of the screw so that at said forward end the radius vector is inclined in the direction of its advance and at an intermediate point of the take-up guide its inclination is reversed and then remains constant, the length of the radius vector increasing from substantially zero at the forward end to a maximum at a point between said forward end and said intermediate point and thereafter decreasing at a constant rate, a pair of co-operating cob-removing rolls positioned immediately below and extending lengthwise of said take-up guide, the clearance between the screw of said take-up guide and said rolls being a minimum, said rolls extending forwardly from the rear end of said take-up guide to approximately said intermediate point, and comprising a roll having a cylindrical ribbed body rigidly mounted on a shaft and merging at the forward end into a smooth frusto-conical portion, said shaft extending beyond said forward end and through a bearing and carrying beyond said bearing a helical screw of constant diameter formed on a frusto-conical core, and a second roll having a cylindrical body rigidly mounted on a second shaft and carrying a square screw thread and merging at its forward end into a frusto-conical portion carrying a rectangular thread the width of whose face diminishes as the thread approaches the smaller end of the frusto-conical portion, said second shaft extending forwardly beyond said second roll and into a bearing located in an advanced position in the harvester with respect to the bearing for the first roll, and means for synchronously driving said take-up guide and said rolls.

JULIO PETRUCHKIN.